United States Patent Office

3,125,425
Patented Mar. 17, 1964

3,125,425
SEPARATION OF GASEOUS FLUORIDES
Adah B. Richmond, Wilmington, Del., assignor to E. I. du Pont de Nemours and Company, Wilmington, Del., a corporation of Delaware
No Drawing. Filed Feb. 23, 1961, Ser. No. 90,913
10 Claims. (Cl. 55—22)

This invention relates to new compositions of matter and to their use in separating and isolating pure gases, particularly nitrogen fluorides from mixtures thereof.

Although many gas mixtures can be at least partially separated by fractional distillation, the degree of separation which can be achieved in cases involving geometric isomers, and mixtures of gases whose boiling points are close, is usually unsatisfactory. Mixtures of low boiling gases, such as mixtures of nitrogen fluorides, require pressure and/or refrigerated distillation equipment, which is expensive, and such distillations present serious explosion hazards.

Dinitrogen difluoride and dinitrogen tetrafluoride have also been separated from admixture with other nitrogen fluorides by gas adsorption chromatography on a dehydrated zeolite, but only the trans-isomer is recovered from the column.

It has now been found that mixtures of low boiling gases of the class consisting of fluorides of oxygen, nitrogen and carbon, for example, mixtures of two or more nitrogen fluorides, e.g., nitrogen trifluoride, dinitrogen tetrafluoride, cis- and trans-dinitrogen difluorides, alone or in admixture with air, oxides of nitrogen, etc., and mixtures of oxygen difluoride with oxygen can be quickly separated and individually recovered by gas chromatography employing the new absorbent composition subsequently described.

The new composition provided by this invention is an activated silica modified with a low molecular weight perhalogenated polymer having a boiling point at 0.5 mm. Hg pressure of between 121° and 260° C., preferably 138° to 210° C., and which is liquid at temperatures as low as 0° C. Preferred perhalogenated polymers are those in which the halogens are fluorine, chlorine or a mixture of the two.

The new compositions of this invention are made by intimately mixing, e.g., by stirring, an activated silica of 20 to 90 mesh, preferably 40 to 80 mesh, with from 5 to 30% by weight of a perhalogenated polymer of the aforementioned kind.

In a preferred method for using the new absorbent composition of this invention, a column is packed with the absorbent composition, and the gas mixture to be separated is caused to flow through the column at a temperature in the range of −80° to +50° C., usually at −25° to +30° C., and a pressure which is sufficient to cause the gas mixture to flow through the column at the desired rate by means of a carrier gas, e.g., helium, nitrogen, argon, carbon dioxide, etc. The pressure at which the gas mixture is passed through the column is dependent, to some extent, on the characteristics of the column, such as length, diameter, mesh size of absorbent composition, etc. Usually, however, it is of the order of one or two atmospheres. In passing through the column, the several components of the gas mixture are separated by selective absorption at various levels in the column.

The size of the sample which can be processed is dependent upon the size of the column. Thus, in a column constructed from a 6′ x 0.25″ (I.D.) tubing packed with 60–80 mesh absorbent composition, optimum gas sample size is 1–5 cc., measured at atmospheric pressure. However, for a 12′ x 0.75″ (I.D.) column, gas samples ranging from 50–500 cc. can be used.

Although the examples which follow illustrate the use of the new absorbent compositions of this invention on a laboratory scale, it is to be understood that this is only for reasons of convenience and that the principles illustrated are equally applicable to large scale operation. These examples are therefore not to be construed as limiting this invention in any way.

EXAMPLE I

A 6′ x 0.25″ (I.D.) column was packed with 60 to 80 mesh activated silica having an average pore diameter of 22 A., a pore volume of 0.45 ml./g., and a surface area of 832 m.²/g., which had been mixed and stirred with a liquid, low molecular weight, chlorotrifluoroethylene polymer distilling at 138° to 210° C./0.5 mm. and having a density of 1.93 at 79° F. in an amount such as to deposit about 10% by weight of the polymer on the silica. The column was cooled to 0° C. and crude nitrogen fluoride obtained by the electrolysis of molten ammonium fluoride [J. Am. Chem. Soc. 81, 6397 (1959)] was passed through the column with helium flowing at the rate of 40 cc./min. Elution times were determined by placing a sample indicator at the end of the column. The sample indicator, based on the Wheatstone bridge principle using thermistors, was hooked to a recorder recording elution times. Under these conditions the elution times were as follows:

| Compound: | Elution time in minutes |
|---|---|
| $N_2$ | 1.75 |
| NO | 2.35 |
| $NF_3$ | 5.00 |
| Trans-$N_2F_2$ | 14.25 |
| Cis-$N_2F_2$ | 17.90 |
| $N_2O$ | 38.20 |

The above experiment was repeated, except that the temperature of the column was 26° C. instead of 0° C. Under these conditions, markedly reduced elution times were obtained, as shown below:

| Compound: | Elution time in minutes |
|---|---|
| $N_2$ | 1.50 |
| NO | 1.90 |
| $NF_3$ | 3.25 |
| Trans-$N_2F_2$ | 7.50 |
| Cis-$N_2F_2$ | 9.00 |
| $N_2O$ | 17.50 |

EXAMPLE II

A 10′ x 0.25″ (I.D.) column was packed with the chlorotrifluoroethylene polymer-treated silica absorbent of Example I and immersed in a bath maintained at 26° C. A sample of crude nitrogen fluoride was injected into the column, with helium flowing at 45 ml./mm. The elution times are given below:

| Compound: | Elution time in minutes |
|---|---|
| $N_2$ | 2.55 |
| NO | 3.25 |
| $NF_3$ | 6.45 |
| Trans-$N_2F_2$ | 14.95 |
| Cis-$N_2F_2$ | 18.05 |
| $N_2O$ | 34.70 |

Repetition of the above experiment using activated silica which had not been treated with the chlorotrifluoroethylene polymer failed to effect separation of the components in the mixture of fluorides of nitrogen. Similarly, use of an activated alumina modified with the chlorotrifluoroethylene polymer failed to effect separation of the components of the mixture of nitrogen fluorides.

EXAMPLE III

Eight samples of a crude mixture of nitrogen trifluoride and dinitrogen difluoride, prepared by electrolysis of molten ammonium fluoride [J. Am. Chem. Soc. 81, 6397 (1959)], were charged to 30 ml. cylinders and pressured onto a 12′ x 0.75″ (I.D.) column prepared as in Example I. By weighing the cylinders before and after loading onto the column, it was found that the samples weighed 2.9 g., 3.5 g., 2.4 g., 2.6 g., 2.9 g., 3.2 g., 3.2 g. and 2.5 g. respectively. The analysis by gas chromatography of the crude mixture before separation was 0.4% $N_2$, 0.5% NO, 92% $NF_3$, 5% trans-$N_2F_2$, 2% cis-$N_2F_2$ and 0.6% $N_2O$.

The outlet of the column was arranged so that the $NF_3$, trans-$N_2F_2$ and cis-$N_2F_2$ could be collected separately at liquid nitrogen temperature. Product was collected when indicated by the recorder as eluting from the column. There was collected 21.47 g. of pure $NF_3$, 0.97 g. of trans-$N_2F_2$, and 0.29 g. of cis-$N_2F_2$.

The fractions were analyzed by gas chromatography using the 6′ x 0.25″ (I.D.) column described in Example I and results were as follows:

*Chromatography Analysis*

| $NF_3$ (G.C.) | trans-$N_2F_2$ (G.C.) | cis-$N_2F_2$ (G.C.) |
|---|---|---|
| 99+percent $NF_3$. 0.08% air. trace NO. | 96% trans-$N_2F_2$. 4% cis-$N_2F_2$. 0.2% air. 0.2 and 0.3% of unknowns. | 92% cis-$N_2F_2$. 2% trans-$N_2F_2$. 3% air. 3% NO. traces of two unknowns. |

EXAMPLE IV

A mixture of oxygen difluoride and oxygen was passed through the column described in Example I. The oxygen eluted at 1.9 minutes and the oxygen difluoride at 3.55 minutes whent the column was held at 0° C. and the gas mixture was passed through the column at a helium flow of 40 ml./min.

EXAMPLE V

A mixture consisting of 75% $CF_4$ and 25% $NF_3$ (by volume) was passed through 10′ x 0.25″ (I.D.) column packed with silica gel (60 to 80 mesh) which had been treated by mixing and agitating so as to deposit 10% by weight of the perhalogenated polymer described in Example I. With the column at 26° C. and a helium flow of 45 ml./min., the $CF_4$ eluted at 5.8 minutes and the $NF_3$ at 6.7 minutes. Peak-area calculations show 77% $CF_4$ and 23% $NF_3$.

Results similar to the above were obtained using $CF_4$/$NF_3$ mixtures containing 25% $CF_4$, 50% $CF_4$, 90% $CF_4$ and 98% $CF_4$, the remainder being $NF_3$.

In place of the chlorotrifluoroethylene polymer used in the detailed examples, there can be used any perhalogenated low molecular weight polymer, i.e., having a molecular weight between 200 and 1500, which is liquid at temperatures as low as 0° C. and which has a boiling point at 0.5 mm. of between 121° and 260° C. The preferred polymer is a commercially available poly(chlorotrifluoroethylene) which boils at 138° to 210° C. at 0.5 mm. and which has a density of 1.93 g./cc. at 79° F., preferred because of the excellent results which are obtained therewith and its ready availability. Examples of other suitable polymers are poly(dichlorodifluoroethylene), poly(trichlorofluoroethylene), the copolymers of tetrafluoroethylene with hexafluoropropylene, and the like.

In Examples I through V commercial activated silica has been used, but this is for convenience only. In place thereof there can be used any active amorphous form of silica, prepared by any of the well-known procedures. Activation of silica is generally carried out by the dehydration of hydrated forms of silica at elevated temperatures. Usually, the active amorphous silica is screened to between 20 and 90 mesh and preferably to between 40 and 80 mesh, and the screened silica is then treated by mixing and stirring it with the low molecular weight perhalogenated polymer to deposit between 5 and 30% by weight thereof on the silica and, preferably, between 8 and 15% by weight.

The column length is not critical and it may be of any convenient length desired.

In practice, the mixture of gases which it is desired to resolve is passed into the column, along with an inert gas. The preferred gas for this purpose is helium because of its chemical inertness and high thermal conductivity.

The flow rate at which the mixture of gases, e.g., fluorides of nitrogen, and inert gas, e.g. helium, is passed through the column is dependent upon the column length, packing density, temperature, and sample size. Too low speeds are undesirable because the time required for analysis is lengthened without compensating advantages in sharpness of separation and too high speeds operate less satisfactorily in separating the components of the mixture. Such high speeds are therefore not used, unless it is desired to effect a gross, rather than sharp, separation of the components of the mixure.

The new absorbent composition of this invention is a silica treated with the low molecular weight perhalogenated polymer. This composition makes possible isolation of individual fluorides of nitrogen from mixtures thereof and particularly the isolation of the cis and trans-forms of dinitrogen difluoride from mixtures containing them and other fluorides of carbon, nitrogen and oxygen.

I claim:

1. A composition useful for gas separations comprising activated silica admixed with from 5 to 30% of a perhalogenated polymer, liquid at 0° C. and having a molecular weight between 200 and 1500 and a boiling point of between 121° C. and 260° C. at 0.5 mm. of Hg pressure.

2. The composition of claim 1 wherein the perhalogenated polymer is a chlorofluorocarbon.

3. The composition of claim 1 wherein the perhalogenated polymer is a polymer of chlorotrifluoroethylene.

4. The process of separating normally gaseous fluorides of the class consisting of fluorides of oxygen, nitrogen and carbon from gaseous mixtures of the class consisting of mixtures of said fluorides and mixtures of said fluorides with gases of the class consisting of oxygen and oxides of nitrogen, which comprises passing a mixture of said gas through a column containing an adsorbent comprising activated silica admixed with from 5 to 30% of a perhalogenated polymer having a molecular weight between 200 and 1500 and a boiling point of between 121° C. and 260° C. at 0.5 mm. Hg pressure, at a temperature of −80° C. to 50° C., and thereafter recovering the individual fluorides of oxygen, nitrogen or carbon.

5. The process as set forth in claim 4 wherein the gas mixture is passed through the column with the aid of an inert gaseous diluent.

6. The process as set forth in claim 4 wherein the halogenated polymer is polychlorotrifluoroethylene.

7. The process as set forth in claim 4 wherein the gas mixture contains nitrogen fluorides.

8. The process as set forth in claim 4 wherein the gas mixture separated comprises greater than 90 volume percent of nitrogen fluorides.

9. The process of claim 4 wherein the gas mixture comprises a mixture of nitrogen trifluoride and dinitrogen difluoride.

10. The process of claim 4 wherein the mixture comprises a mixture of cis-dinitrogen difluoride and trans-dinitrogen difluoride.

References Cited in the file of this patent

UNITED STATES PATENTS 2,847,391    Wheeler _____ Aug. 12, 1958